(12) United States Patent
Rasras (10) Patent No.: US 7,822,298 B2
(45) Date of Patent: Oct. 26, 2010

(54) POLARIZATION COMPONENT PROCESSOR, METHOD OF PROCESSING POLARIZATION COMPONENTS AND INTEGRATED PHOTONIC CIRCUIT EMPLOYING THE SAME

(75) Inventor: Mahmoud Rasras, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 290 days.

(21) Appl. No.: 12/103,540

(22) Filed: Apr. 15, 2008

(65) Prior Publication Data

US 2009/0257706 A1 Oct. 15, 2009

(51) Int. Cl.
G02B 6/00 (2006.01)
G02B 6/42 (2006.01)
G02F 1/01 (2006.01)

(52) U.S. Cl. .............................. 385/11; 385/1; 385/45; 385/48

(58) Field of Classification Search ................ 385/1–3, 385/11, 45, 48
See application file for complete search history.

(56) References Cited

U.S. PATENT DOCUMENTS

| 5,526,453 A | 6/1996 | Wolf et al. |
|---|---|---|
| 5,719,976 A | 2/1998 | Henry et al. |
| 6,175,668 B1 * | 1/2001 | Borrelli et al. ................ 385/11 |
| 6,643,431 B2 * | 11/2003 | Hatayama et al. ............. 385/39 |
| 2003/0081873 A1 * | 5/2003 | Tan et al. ...................... 385/11 |
| 2003/0180027 A1 * | 9/2003 | Oaknin et al. ............... 385/140 |

\* cited by examiner

*Primary Examiner*—Rhonda S Peace
(74) *Attorney, Agent, or Firm*—Hitt Gaines, PC

(57) ABSTRACT

An apparatus and a method by which polarization components may be processed separately, for example, to enable a polarization beam splitter (PBS) or a switch. In one embodiment, the apparatus includes: first and second Mach-Zehnder interferometers, each Mach-Zehnder interferometer having input and output optical couplers and two internal optical arms, each optical arm connecting one output of the input optical coupler to a corresponding input of the output optical coupler, the output optical coupler of the first Mach-Zehnder interferometer being the input optical coupler of the second Mach-Zehnder interferometer, wherein the input optical coupler of the first Mach-Zehnder interferometer is configured to transmit one polarization component of the light to two of the outputs thereof and to transmit a different polarization of the light to substantially only one of the outputs thereof in response to receiving said light at an input thereof.

20 Claims, 7 Drawing Sheets

POLARIZATION COMPONENT PROCESSOR, METHOD OF PROCESSING POLARIZATION COMPONENTS AND INTEGRATED PHOTONIC CIRCUIT EMPLOYING THE SAME

TECHNICAL FIELD OF THE INVENTION

The invention is directed to optical signal processing and more particularly to the processing of polarization components.

BACKGROUND OF THE INVENTION

This section introduces aspects that may help facilitate a better understanding of the invention. Accordingly, the statements of this section are to be read in this light and are not to be understood as admissions about what is, or what is not, prior art.

Systems employing integrated photonic circuits can provide powerful platforms for ultra-wide-band signal processing. Silicon-based integrated photonic circuits hold a particularly promising future for high-level integration of photonic circuits. For example, integrated photonic circuits are used in both the transmitters and receivers of modern optical transmission systems.

Polarization diversity is an important requirement of many optical circuits; polarization diverse circuits process light independent of its polarization. Such circuits are capable of supporting modern plural polarization modulation techniques such as the recently developed dual-polarization quadrature phase-shift keying (DPQPSK) advanced modulation technique. Plural polarization modulation techniques allow optical fibers and monolithic waveguides to carry more data than they could previously, resulting in very high data transmission rates.

A polarization beam splitter (PBS) is useful for implementing polarization diversity. A PBS splits light traveling in a waveguide into transverse electric (TE) and transverse magnetic (TM) polarization components. The TE and TM polarization components can thereafter be processed in separate ways that take into account their differing physical characteristics.

A PBS is often constructed from a single imbalanced Mach-Zehnder interferometer. However, an imbalanced Mach-Zehnder interferometer does not allow each polarization component to be adjusted independently. This substantially limits its utility in modern optical transmission systems.

A PBS may also be constructed from a single evanescent coupler formed in silicon and having large differences TE and TM group indices of refraction. The advantage of an evanescent coupler is that it is compact and its operation is relatively simple. Unfortunately, it is relatively difficult and expensive to manufacture and is typically wavelength-dependent, which narrows its effective bandwidth and therefore its utility in modern optical transmission systems.

SUMMARY

To address the above-discussed deficiencies of the prior art, one embodiment provides an apparatus, including: first and second Mach-Zehnder interferometers, each Mach-Zehnder interferometer having input and output optical couplers and two internal optical arms, each optical arm connecting one output of the input optical coupler to a corresponding input of the output optical coupler, the output optical coupler of the first Mach-Zehnder interferometer being the input optical coupler of the second Mach-Zehnder interferometer, wherein the input optical coupler of the first Mach-Zehnder interferometer is configured to transmit one polarization component of the light to two of the outputs thereof and to transmit a different polarization of the light to substantially only one of the outputs thereof in response to receiving the light at an input thereof.

Other embodiments provide a method. In one such embodiment, a method includes: (1) receiving light of first and second orthogonal polarizations at an input of a first Mach-Zehnder interferometer having first and second internal optical arms, (2) transmitting the light to the internal optical arms such that one polarization component of the light is transmitted to both arms and the other polarization component of the light is transmitted substantially to only one of the arms and (3) transmitting the light from the first and second arms to internal optical arms of a second Mach-Zehnder interferometer such that the other polarization component of the light is transmitted to both arms and the one polarization component of the light is transmitted substantially to only one of the arms.

BRIEF DESCRIPTION OF THE DRAWINGS

For a more complete understanding of the invention, reference is now made to the following descriptions taken in conjunction with the accompanying drawings, in which.

DETAILED DESCRIPTION

Hereinafter described are various embodiments of polarization component processors in which amplitudes and phases of both TE and TM polarization components of an optical signal can be adjusted independently. The architecture of the polarization component processors can exhibit broadband operation, making them particularly desirable for use in both the transmitters and receivers of modern optical transmission systems.

Certain of the embodiments are directed to PBSs and methods of splitting light into polarization components. Certain of those embodiments are directed to PBSs embodied in integrated photonic circuits. In some embodiments, the integrated photonic circuits are silicon-based. In more specific embodiments, the integrated photonic circuits contain complementary metal-oxide semiconductor (CMOS) electronic circuitry.

The polarization component processor can also be used as a polarization-insensitive switch and other functions requiring substantially independent adjustments of either or both of amplitude and phase to either or both of TE and TM polarization components.

In general, the polarization component processor employs two cascaded Mach-Zehnder (MZ) interferometers that can be used to independently adjust the TE and TM polarization components. As will be described below, the polarization component processor takes advantage of the fact that couplers in silicon can be designed such that they split the polarization components with different ratios. The length of a coupler can be selected such that, for example, the TM polarization component is divided roughly evenly between the crossport output, and the throughport output the TE polarization component is directed almost 100% to, e.g., the throughport output. By carefully selecting coupler length and gap, different configurations can be realized.

As one example, various embodiments of a polarization component processor may be constructed in a silicon substrate using a waveguide height of about 0.2 μm, a waveguide width of about 0.5 μm and a coupler gap of about 0.2 μm. The Table, below, sets forth examples of coupler lengths stemming from desired coupling ratios. Also, U.S. Pat. No. 5,719, 976, which issued to Henry, et al., on Feb. 17, 1998, entitled "Optimized Waveguide Structure," and U.S. Pat. No. 5,526, 453, which issued to Wolf, et al., on Jun. 11, 1996, entitled "Integrated optical coupler," teach waveguides and couplers that are used with certain embodiments disclosed herein and are incorporated herein by reference.

TABLE

| Coupler Lengths for Desired Coupling Ratios | | | |
|---|---|---|---|
| 100% TE, 50/50 TM | 100% TM, 50/50 TE | 0% TE, 50/50 TM | 0% TM, 50/50 TE |
| 36.66 μm | 54 μm | 3.33 μm | 18.33 μm |

Certain embodiments of the polarization component processor and the method of splitting light into polarization components have one or more of the following advantages. First, they can provide high extinction polarization beam splitting over a broad range of wavelengths. Second, they can be compact and relatively tolerant of fabrication process variations. Third, they can adjust the amplitude coefficients and relative phases of TE and TM polarization components independently. Fourth, they can be integrated with other electronics and photonics polarization components on a single substrate to form an integrated photonic circuit.

Figure 1A:
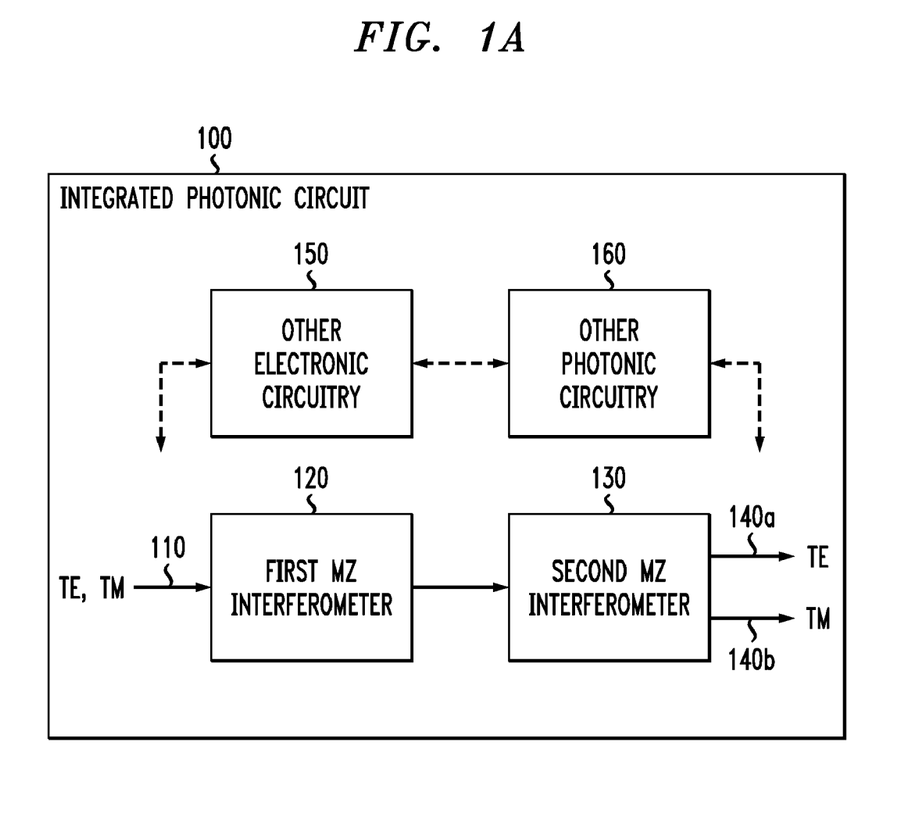
FIG. 1A is a block diagram of one embodiment of an integrated photonic circuit containing a polarization component processor and other electronic and photonic circuitry that may make use of the polarization components that the polarization component processor is configured to separate.

FIG. 1A is a block diagram of one embodiment of an integrated photonic circuit, generally designated 100. The integrated photonic circuit is embodied on or in (the two terms are used interchangeably) a monolithic substrate, which may be a silicon substrate. Those skilled in the pertinent art are familiar with the properties, design, fabrication and use of monolithic substrates, particularly those composed of silicon.

The integrated photonic circuit 100 contains an embodiment of a polarization component splitter (PBS). The PBS receives light having orthogonal TE and TM polarization components at an input 110. Depending upon the particular embodiment, one of the polarization components (either TE or TM) is regarded as a first polarization component; consequently, the other of the polarization components is regarded as a different second polarization component. A first MZ interferometer 120 receives both the TE and TM polarization components and processes the first polarization component. In one embodiment, the first MZ interferometer 120 processes only the first polarization component and, except for perhaps incidentally shifting its phase, passes the second polarization component through without processing it. A second MZ interferometer 130 is coupled to the first MZ interferometer 120. The second MZ interferometer 130 then receives both the TE and TM polarization components and processes the second polarization component. In one embodiment, the second MZ interferometer 130 processes only the second polarization component and, except for perhaps incidentally shifting its phase, passes the first polarization component through without processing it.

Herein, a MZ interferometer processes one of the TE and TM polarization components and passes the other one without substantial processing thereof. The passed polarization component may receive an incidental phase shift. The MZ interferometer may also be designated to process that polarization component with precompensation or postcompensation to remove such incidental phase shifts.

In the embodiment of FIG. 1A, the second MZ interferometer 130 has two outputs, one designated 140a for the first polarization component (e.g., TE) and one designated 140b for the second polarization component (e.g., TM).

Other electronic circuitry 150, e.g., CMOS electronic circuitry such as a processor, memory, logic circuits and analog devices, are on the same substrate as the polarization component processor, i.e., in the integrated photonic circuit 100. The other electronic circuitry 150 may include a controller configured to control the polarization component processor to cause it to perform in a desired manner. Likewise, other photonic circuitry 160, e.g., optical modulator(s), optical filter(s) and optical waveguide(s) may be located on the same substrate as the polarization component processor in the integrated photonic circuit 100. The other electronic circuitry 150 and the other photonic circuitry 160 may interact with each other and with the polarization component processor, as broken-line arrows in FIG. 1A indicate.

Figure 1B:
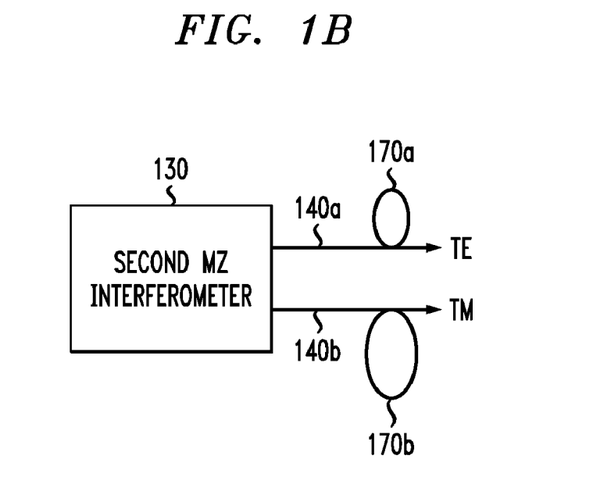
FIG. 1B is a block diagram of a portion of the integrated photonic circuit of FIG. 1A.

FIG. 1B is a block diagram of a portion of the integrated photonic circuit of FIG. 1A. FIG. 1B is presented primarily for the purpose of showing an embodiment of the polarization component processor in which resonant optical filters 170a, 170b are located at the outputs 140a, 140b of the second MZ interferometer 130. The optical filters 170a, 170b, which amount to resonant optical waveguide loops, improve the extinction ratio of the undesired polarization components at the optical outputs 140a, 140b of the polarization component processor. Since the TE polarization component is more confined than the TM polarization component, the optical filter 170a is illustrated as having a tighter minimum bend radius than the filter 170b. In one embodiment, the filter 170a includes a silicon waveguide loop having a minimum bend radius of about 2 μm, while the filter 170b includes a silicon waveguide having a minimum bend radius of about 15 μm.

Figure 2:
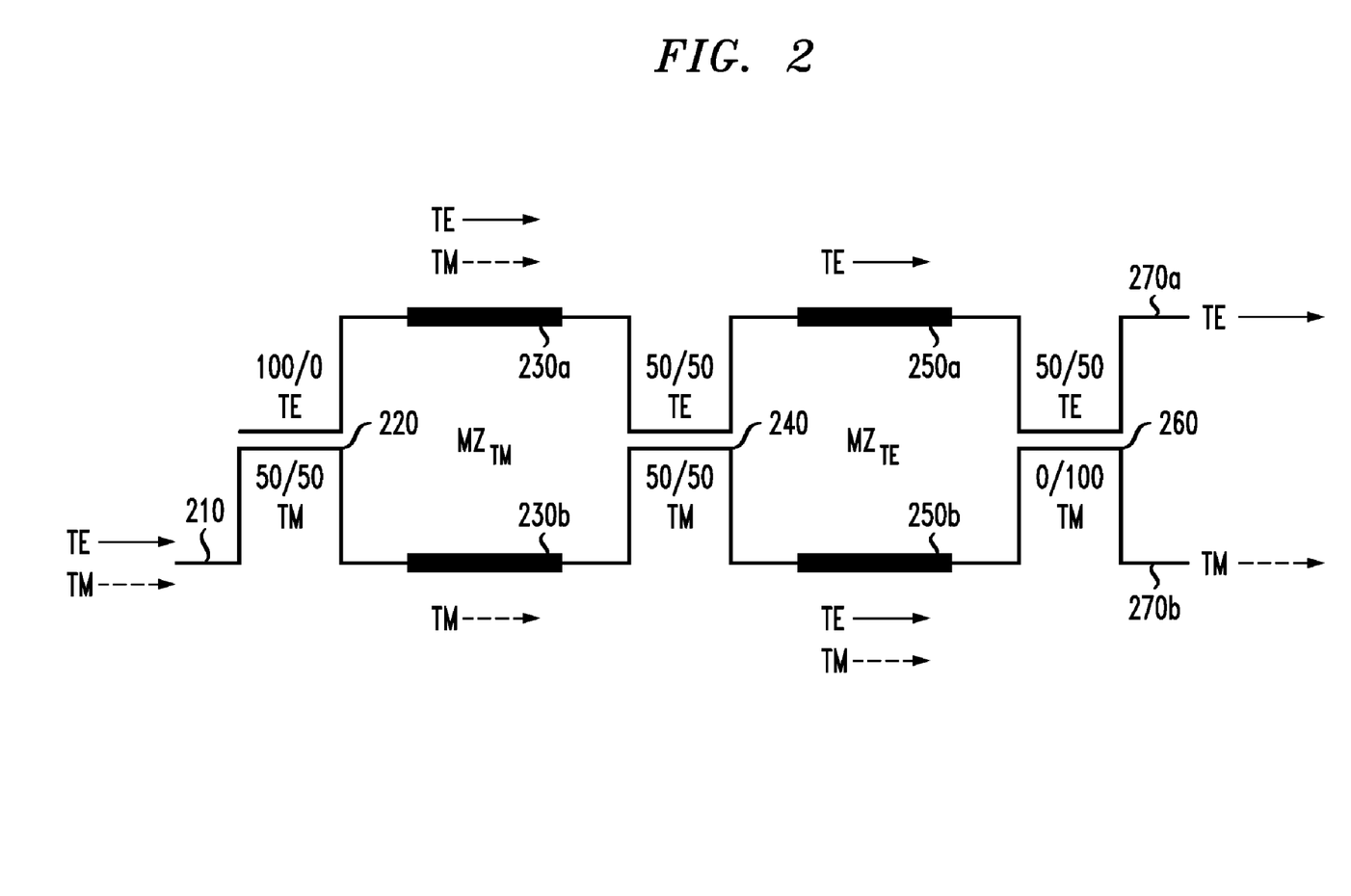
FIG. 2 is a schematic diagram of one embodiment of a polarization component processor that takes the form of a PBS.
Figure 3:
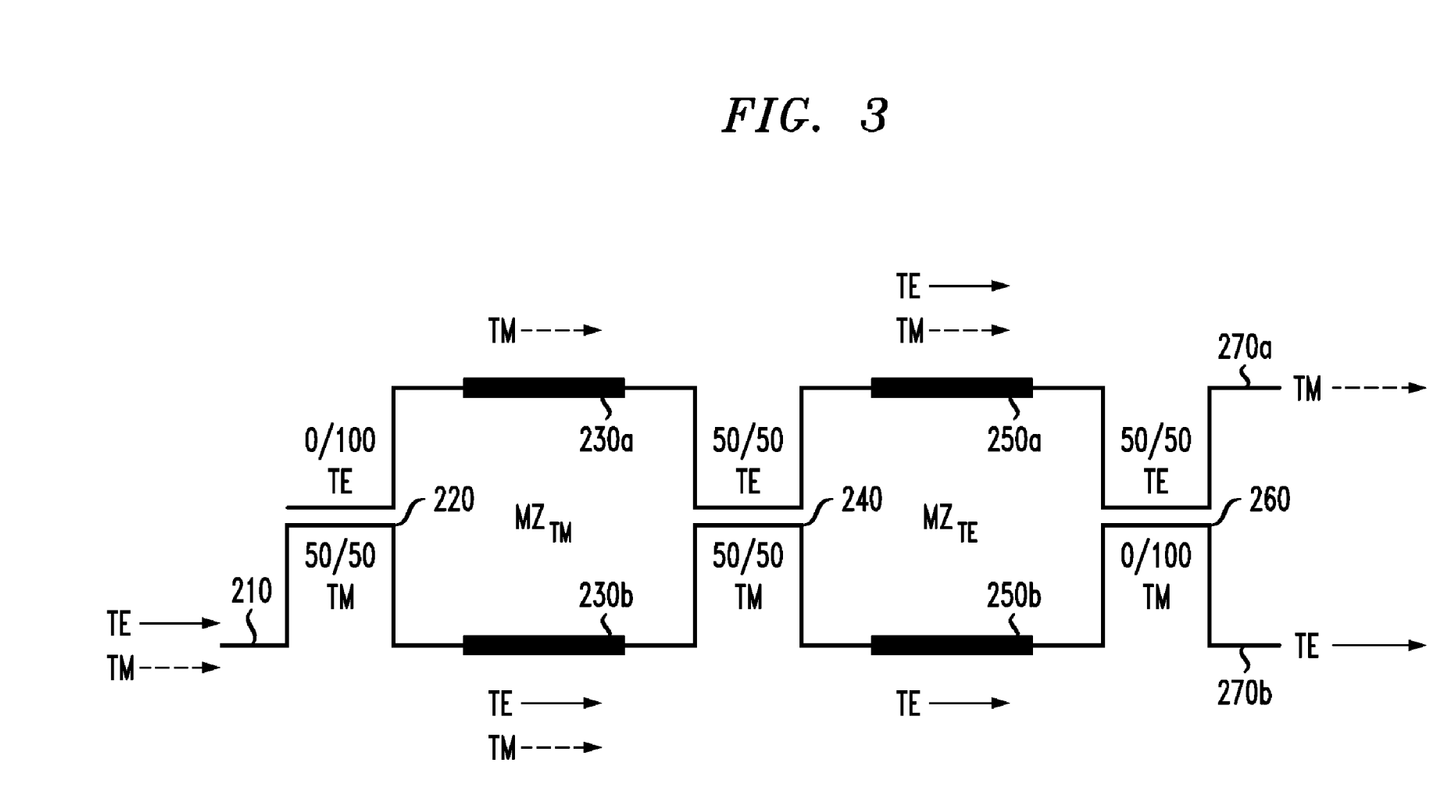
FIG. 3 is a schematic diagram of another embodiment of a polarization component processor that takes the form of a PBS.
Figure 4:
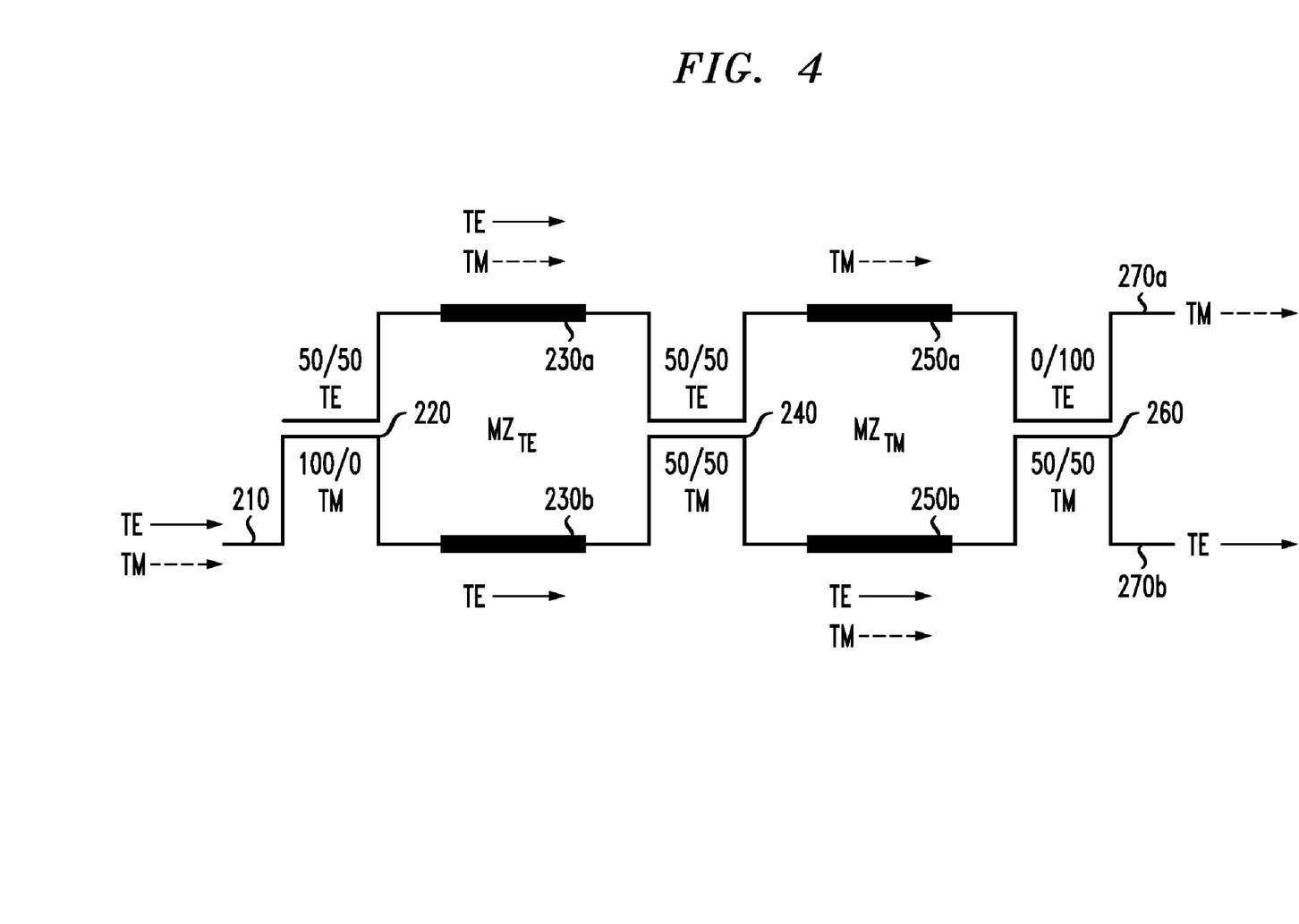
FIG. 4 is a schematic diagram of yet another embodiment of a polarization component processor that takes the form of a PBS.
Figure 5:
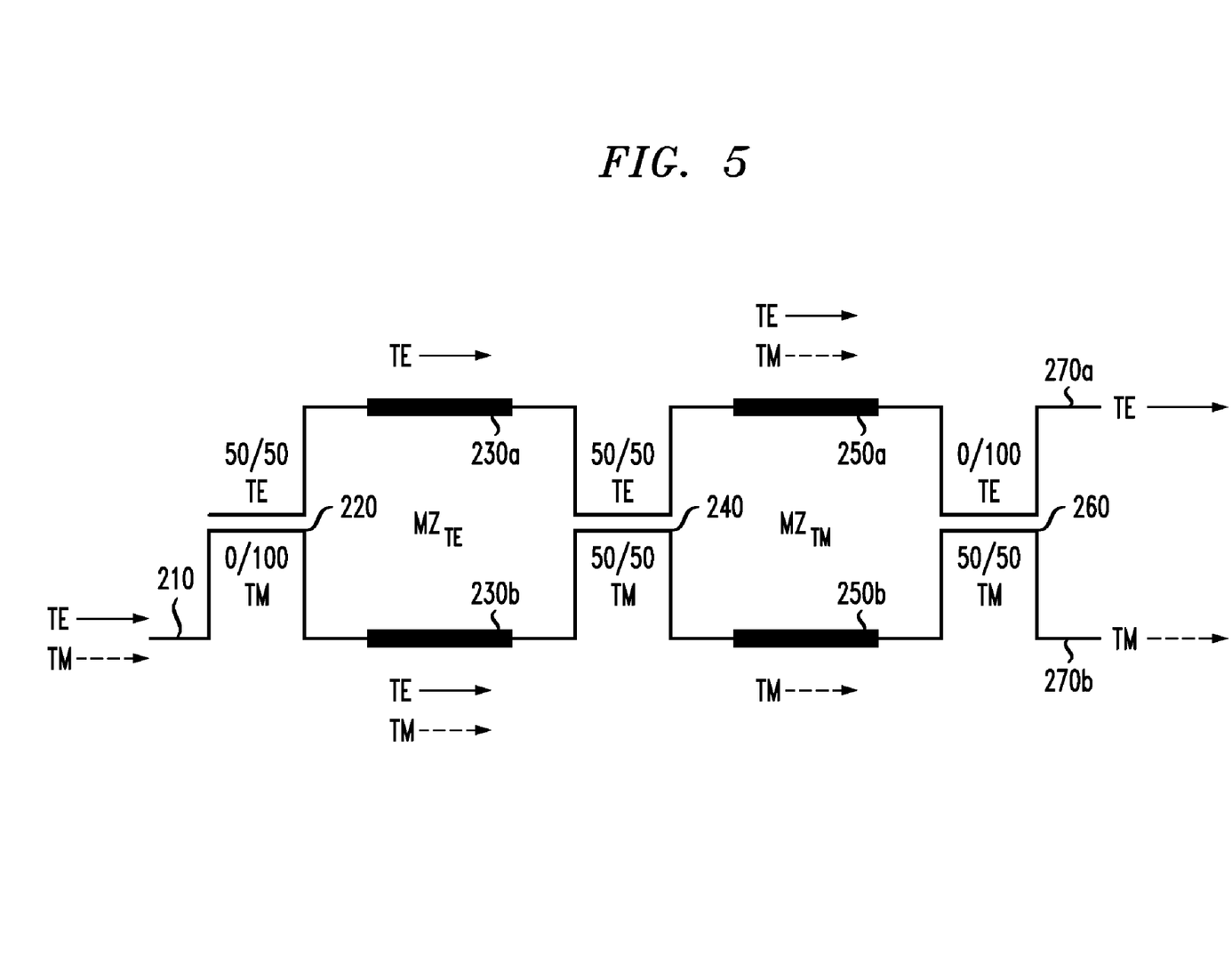
FIG. 5 is a schematic diagram of still another embodiment of a polarization component processor that takes the form of a PBS.

FIG. 2 is a schematic diagram of one embodiment of a polarization component processor. Solid-line and broken line arrows denote the TE and TM polarization components and their direction of travel. As in FIG. 1A, the processor is configured as a PBS.

The PBS has an input 210. Other embodiments of the PBS may have additional inputs. The input 210 accepts light having both TE and TM polarization components as shown. A first MZ interferometer adjusts the amplitude and phase of the TM polarization component and is therefore is designated $MZ_{TM}$. $MZ_{TM}$ has a first optical coupler 220 (which is, in the embodiment of FIG. 2, an evanescent 1×2 optical coupler), upper and lower optical arms and a second 2×2 optical coupler 240 (which is, in the embodiment of FIG. 2, an evanescent 2×2 optical coupler). The upper optical arm has a controllable phase shifter 230a, and the lower optical arm has a controllable phase shifter 230b. In an alternative embodiment, only one of the upper and lower optical arms has a controllable phase shifter; the other arm is a waveguide.

A second MZ interferometer adjusts the amplitude and phase of the TE polarization component and is therefore designated $MZ_{TE}$. $MZ_{TE}$ shares the second optical coupler 240 with, and therefore overlaps, $MZ_{TM}$, i.e., the output optical coupler of $MZ_{TM}$ is the input optical coupler of $MZ_{TE}$. $MZ_{TE}$ also has upper and lower optical arms and a third optical coupler 260 (which is, in the embodiment of FIG. 2, an evanescent 2×2 optical coupler). The upper arm has a controllable phase shifter 250a, and the lower optical arm has a controllable phase shifter 250b. In an alternative embodiment, only one of the upper and lower optical arms has a controllable phase shifter; the other arm is a waveguide.

The PBS terminates in two outputs 270a, 270b, i.e., of the third optical coupler 260. In the embodiment of FIG. 2, one of the outputs 270a emits light having substantially only a TE polarization component. The other output 270b emits light having substantially only a TM polarization component. The outputs 270a, 270b may be filtered as FIG. 1B shows.

As those skilled in the pertinent art understand, an important property of an optical coupler is its coupling ratio to its two optical outputs, which may be polarization-dependent. In the present context, the second and third optical couplers 240, 260 may have different coupling ratios for TE and TM polarization components.

The first optical coupler 220 is configured such that it directs substantially all of the TE polarization component incoming to one optical input to the crossport optical output with respect to the optical input. Thus, this coupler has a label "100/0 TE" in FIG. 2, which indicates that 100% of the input TE polarization component light is directed by the optical coupler 220 to the crossed optical output and 0% of the input TE polarization component light is directed to the throughput optical output. The optical coupler 220 is configured to divide the incoming TM polarization component light substantially equally between its crossport optical output and its throughport optical output. The optical coupler 220 therefore is also labeled "50/50 TM" in FIG. 2 to indicate that it directs 50% of the TM polarization component light input to each optical input to each optical output thereof.

The second optical coupler 240 is configured such that it divides both the incoming TE and TM polarization components substantially equally between its crossport output and its throughport output. The second optical coupler 240 is therefore labeled as "50/50 TE" and "50/50 TM" in FIG. 2, i.e., 50% of both polarization components to each optical input is directed by the second optical coupler 240 to each optical output thereof.

The third optical coupler 260 is configured to divide TE polarization component light insubstantially equally between its crossport optical output and its throughport optical output. Thus, the third optical coupler 260 is a labeled as "50/50 TE" in FIG. 2 to indicate that it directs about 50% of the incoming TE polarization component light to each of its output ports and is labeled as "0/100 TM" to indicate that it directs substantially all of the incoming TM polarization component to an optical input to the corresponding throughput optical output.

In the illustrated embodiment, the first optical coupler 220 and the third optical coupler 260 are designed and fabricated to direct light of one polarization state substantially to only one output (i.e., about 100% to one optical output and about 0% to the other optical output). In other words, the first optical coupler 220 and the third optical coupler 260 are designed and fabricated such that little light of one polarization will leak to one output thereof when the light is incoming to them. Alternative embodiments of the PBS employ first and third couplers 220, 260 that direct at least 70% of light of one polarization state to only one output (i.e., at least 70% to one optical output and at most 30% to the other optical output). The second optical coupler 240 is designed and fabricated such that it more or less evenly divides light of each polarization state between its outputs. $MZ_{TM}$ and $MZ_{TE}$ are capable of making some adjustment to the nominal "100/0," "0/100" and "50/50" coupling ratios in real-time.

Heaters (not shown) control the phase shifters 230a, 230b, 250a, 250b to adjust the extent to which they phase-shift the phase of light passing through them. An electronic controller (also not shown) is configured to drive the heaters to cause $MZ_{TM}$ and $MZ_{TE}$ to process the light in the desired way. In the embodiment of FIG. 2, the controller drives the heaters of $MZ_{TM}$ and $MZ_{TE}$ to split the light into separate TE and TM beams.

$MZ_{TM}$ is configured to cause the TM polarization component to interfere in the second optical coupler 240 so that only one of its outputs transmits the TM polarization component when the first optical coupler 220 introduces about equal intensities of TM polarization component into the internal arms of $MZ_{TM}$. More specifically, the one or more phase-shifters 230a, 230b, are configured to set the phases of the TM polarization components in the internal arms of $MZ_{TM}$ so that interference in the second optical coupler 240 of such TM polarization component produces such a result. Because the TE polarization component propagates along only one (e.g., the upper) arm of $MZ_{TM}$, $MZ_{TM}$ operates as a waveguide to the TE polarization component and does not adjust its coupling ratio to the two outputs of the second optical coupler 240.

Likewise, $MZ_{TE}$ is configured to cause the TE polarization component to interfere in the third optical coupler 260 so that only one of its outputs transmits the TE polarization component when the second optical coupler 240 introduces about equal intensities of TE polarization component into the internal arms of $MZ_{TE}$. More specifically, the one or more phase-shifters 250a, 250b, are configured to set the phases of the TE polarization components in the internal arms of $MZ_{TE}$ so that interference in the third optical coupler 260 of such TE polarization component produces such a result. Because the TM polarization component propagates along only one (e.g., the lower) arm of $MZ_{TE}$, $MZ_{TE}$ operates as a waveguide to the TM polarization component and does not adjust its coupling ratio to the two outputs of the third optical coupler 260.

In FIGS. 2-5, each apparatus includes first and second MZ interferometers. Each of such MZ interferometer includes input and output optical couplers, e.g., the optical couplers 220, 240, 260, and a pair of internal optical arms, i.e., delay-adjustable optical waveguides. Each such optical waveguide connects one optical output of the input optical coupler to one optical input of the output optical coupler of the same MZ interferometer. In each apparatus of FIGS. 2-5, the two MZ interferometers share one of the optical couplers, i.e., the second optical coupler 240. The second optical coupler 240 functions as the output optical coupler of the first MZ interferometer and the input optical coupler of the second MZ interferometer. Due to this "sharing," the two MZ interferometers physically overlap.

The first and third optical couplers 220, 260 are configured to process the two different polarization components differently. In particular, each of the first and third optical couplers 220, 260 is configured to transmit one polarization component to substantially only one optical output thereof in response to receiving the light on one optical input thereof. In addition, each of the first and third optical couplers 220, 260 is configured to transmit the other polarization component to both optical outputs thereof with substantially equal intensity in response to receiving the light on either optical input thereof. Due to the polarization dependence of the optical coupler 220, one polarization component is transmitted predominantly to one of internal optical waveguides of the first MZ interferometer in response to being received in an optical input of the first optical coupler 220. Due to the polarization dependence of the third optical coupler 260, the same polarization component is transmitted predominantly only to one optical output of the apparatus if only one input of the third optical coupler 260 receives such light.

Each MZ interferometer of FIGS. 2-5 is also internally configured to transmit polarization component to each of its two outputs in response to receiving light of that polarization component in both of its internal arms. In particular, one or both of the arms includes an adjustable optical phase shifter 230*a*, 230*b*, 250*a*, 250*b*, e.g., conventional electro-optically or thermally operated phase shifters. The one or more internal phase shifters 230*a*, 230*b*, 250*a*, 250*b* are configured cause light of the polarization to interfere in the respective output couplers of each MZ interferometer such that light of the polarization is substantially transmitted to only one of the two outputs of the MZ interferometer. In each apparatus of FIGS. 2-5, the first MZ and second MZ interferometers are configured to cause such interference substantially to direct different polarization component to different outputs thereof.

Finally, by combining the polarization dependencies of the first and third optical couplers 220, 260 and the polarization directing caused by interference in the second and third optical couplers 240, 260, the apparatus of FIGS. 2-5 are able to substantially transmit orthogonal polarization components of received light to separate optical outputs. For that reason, these apparatus function as polarization beam splitters.

Figure 6:
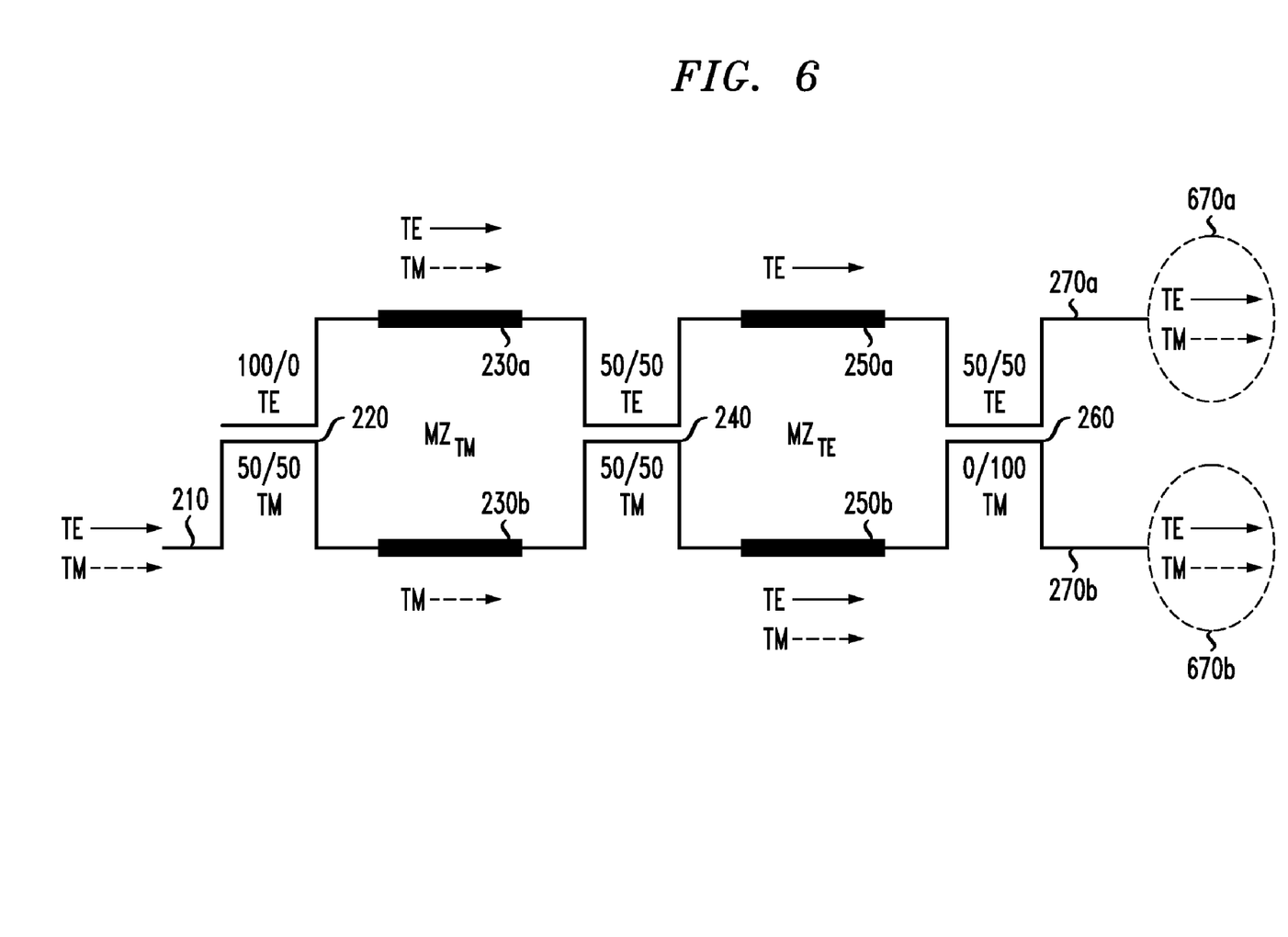
FIG. 6 is a schematic diagram of an embodiment of a polarization component processor that takes the form of a switch.

As its name implies, the polarization component processor is capable of more than polarization beam splitting and finds use in a variety of applications that would benefit from polarization diversity. One embodiment of the polarization component processor operates as a polarization insensitive switch. Referring to FIG. 6, $MZ_{TM}$ determines the coupling ratio of the TM polarization component, and $MZ_{TE}$ determines the coupling ratio of the TE polarization component in this embodiment. Note that the third optical coupler 260 does not affect the coupling ratio for the TM mode since it has a 0% TM nominal coupling ratio. On the other hand, $MZ_{TE}$ can compensate for any minor excursions the first optical coupler 220 may exhibit from its nominal 100% TE coupling ratio. As a result, either or both of the TE and TM polarization components can be routed to either or both of the outputs 270*a*, 270*b* in any desired ratio as alternatives 670*a*, 670*b* are intended to indicate to effect switching or other processing of light presented at the input 210.

Figure 7:
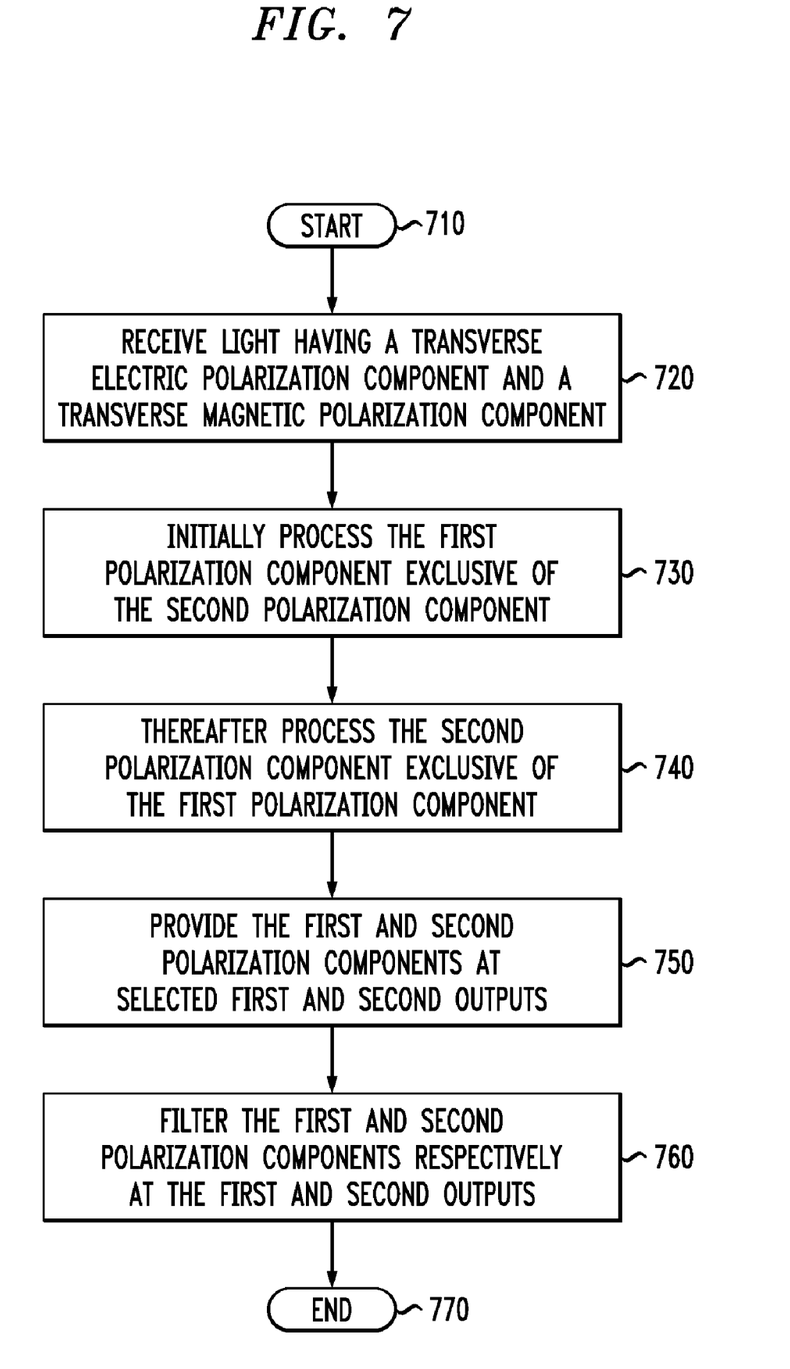
FIG. 7 is a flow diagram of one embodiment of a method of processing polarization components.

FIG. 7 is a flow diagram of one embodiment of a method of processing polarization components. The method begins in a step 710. In a step 720, light having a TE polarization component and a TM polarization component is received at an input. For purposes of this discussion, either the TE polarization component or the TM polarization component is designated as being a first polarization component and the other is designated as being a second polarization component.

In a step 730, the first polarization component is initially processed exclusive of the second polarization component (which is instead passed). In a step 740, the second polarization component is thereafter processed exclusive of the first polarization component (which is instead passed). In a step 750, the first and second polarization components are provided at respective first and second outputs. In a step 760, the first and second polarization components are respectively filtered at the first and second outputs. The method end in an end step 770.

Those skilled in the art to which the invention relates will appreciate that other and further additions, deletions, substitutions and modifications may be made to the described embodiments without departing from the scope of the invention.

What is claimed is:

1. An apparatus, comprising:
   first and second Mach-Zehnder interferometers, each Mach-Zehnder interferometer having input and output optical couplers and two internal optical arms, each optical arm connecting one output of the input optical coupler to a corresponding input of the output optical coupler, the output optical coupler of the first Mach-Zehnder interferometer being the input optical coupler of the second Mach-Zehnder interferometer; and
   wherein the input optical coupler of the first Mach-Zehnder interferometer is configured to transmit one polarization component of the light to two of the outputs thereof and to transmit another polarization component of the light to substantially only one of the outputs thereof in response to receiving said light at an input thereof.

2. The apparatus as recited in claim 1 wherein the input optical coupler of the first Mach-Zehnder interferometer is configured to transmit at least 70% of the light of the one polarization component of the light to the one of the outputs thereof in response to receiving light at the input thereof.

3. The apparatus as recited in claim 1 wherein the output optical coupler of the second Mach-Zehnder interferometer is configured to transmit a particular polarization component of the light to substantially only one of the outputs thereof in response to receiving said particular polarization component at an input of said output optical coupler of the second Mach-Zehnder interferometer.

4. The apparatus as recited in claim 3 wherein the output optical coupler of the second Mach-Zehnder interferometer is configured to transmit at least 70% of the light of the particular polarization to the one of the outputs thereof in response to receiving light of said particular polarization at the input thereof.

5. The apparatus as recited in claim 3 wherein the second Mach-Zehnder interferometer has first and second outputs and the apparatus is configured to provide orthogonal polarizations of light to the first and second outputs of the second Mach-Zehnder interferometer.

6. The apparatus as recited in claim 1 wherein the second Mach-Zehnder interferometer has first and second outputs and the apparatus is configured to provide orthogonal polarizations of light to the first and second outputs of the second Mach-Zehnder interferometer.

7. The apparatus as recited in claim 1 wherein each of the Mach-Zehnder interferometers is configured to provide light of a particular polarization to substantially only one output thereof in response to light of said particular polarization being transmitted to both optical arms thereof.

8. The apparatus as recited in claim 7 wherein the particular polarizations for first and second Mach-Zehnder interferometers are substantially orthogonal.

9. The apparatus as recited in claim 1 further comprising polarization-sensitive filters coupled to the outputs of the second Mach-Zehnder interferometer.

10. The apparatus as recited in claim 1 wherein said interferometers are formed on a monolithic substrate.

11. A method, comprising:
receiving light of first and second different polarizations at an input of a first Mach-Zehnder interferometer having first and second internal optical arms;
transmitting the light to the internal optical arms such that one polarization component of the light is transmitted to both arms and another polarization component of the light is transmitted substantially to only one of the arms; and
transmitting the light from the first and second arms to internal optical arms of a second Mach-Zehnder interferometer such that the other polarization component of the light is transmitted to both arms and the one polarization component of the light is transmitted substantially to only one of the arms.

12. The method as recited in claim 11 wherein the transmitting the light from the first and second arms to the internal optical arms of the second Mach-Zehnder interferometer is such that the second Mach-Zehnder interferometer substantially separates the one and the other polarization components of the light on outputs thereof.

13. The method as recited in claim 11 wherein the transmitting the light from the first and second arms to the internal optical arms of the second Mach-Zehnder interferometer is such that light orthogonal to the particular polarization is transmitted substantially to both arms of the second interferometer.

14. The method as recited in claim 13 further comprising transmitting at least 70% of the one polarization component of the light to the one of the outputs of the second Mach-Zehnder interferometer in response to receiving light of said particular polarization at the input thereof.

15. The apparatus as recited in claim 13 wherein the second Mach-Zehnder interferometer has first and second outputs and the method further comprises providing orthogonal polarizations of light to the first and second outputs of the second Mach-Zehnder interferometer.

16. The apparatus as recited in claim 11 wherein the second Mach-Zehnder interferometer has first and second outputs and the method further comprises providing orthogonal polarizations of light to the first and second outputs of the second Mach-Zehnder interferometer.

17. The apparatus as recited in claim 11 wherein each of the Mach-Zehnder interferometers is configured to provide light of a particular polarization to substantially only one output thereof in response to light of said particular polarization being transmitted to both optical arms thereof.

18. The apparatus as recited in claim 17 wherein the particular polarizations for first and second Mach-Zehnder interferometers are substantially orthogonal.

19. The apparatus as recited in claim 11 further comprising filtering the at least one of the outputs of the second Mach-Zehnder interferometer.

20. The apparatus as recited in claim 11 wherein said method is carried out on a monolithic substrate.

* * * * *